United States Patent Office 3,796,795
Patented Mar. 12, 1974

3,796,795
REDUCING OXYSULFUR COMPOUNDS WITH A BIMETALLIC CATALYST
Peter Urban, Northbrook, and David J. Albert, Chicago, Ill., assignors to Universal Oil Products Company, Des Plaines, Ill.
No Drawing. Original application Feb. 8, 1971, Ser. No. 113,724. Divided and this application Sept. 14, 1972, Ser. No. 289,191
Int. Cl. C01b 17/20, 17/28; C01c 1/20
U.S. Cl. 423—560  20 Claims

ABSTRACT OF THE DISCLOSURE

A method for the low temperature reduction of oxysulfur compounds with hydrogen using a novel bimetallic catalyst is disclosed. The bimetallic catalyst is a combination of catalytically effective amounts of molybdenum sulfide and of cobalt sulfide with a porous carrier material. It is prepared by impregnating the carrier material with a first metallic component, drying and sulfiding to form a sulfided monometallic composite, purging free sulfide from contact with same, impregnating the resulting composite with the second metallic component to form a bimetallic composite, and thereafter, drying and sulfiding the resulting bimetallic composite to produce the bimetallic catalyst. A specific example of the disclosed invention is a method for reducing an inorganic, water-soluble oxysulfur compound wherein an aqueous solution of the oxysulfur compound and hydrogen are contacted with the novel bimetallic catalyst at reduction conditions.

CROSS-REFERENCES TO RELATED APPLICATIONS

This application is a division of our prior, copending application Ser. No. 113,724 filed Feb. 8, 1971 now U.S. Pat. No. 3,725,303.

DISCLOSURE

The subject of the present invention is the use in reducing oxysulfur compounds of a novel bimetallic catalyst which essentially comprises a combination of catalytically effective amounts of molybdenum sulfide and of cobalt sulfide with a porous carrier material. The bimetallic catalyst is characterized by a novel sequential impregnation procedure which is used to prepare the composite in order to insure uniform distribution of the metallic components throughout the carrier material. The resulting bimetallic catalyst is especially useful in a method for the catalytic conversion of an inorganic water-soluble oxysulfur compound to a sulfur-containing compound which has its sulfur component at a lower valence state than in the oxysulfur compound—primarily the conversion of the oxysulfur compound to the corresponding sulfide compound. More specifically, the present invention pertains to a bimetalic catalyst which is prepared according to a procedure which insures that both components are uniformly distributed throughout the support and available in a mutually interacting and sulfided form. In one more limited aspect, the present invention involves a method for reducing a water-soluble thiosulfate compound to the corresponding sulfide compound wherein an aqueous solution of the oxysulfur compound and hydrogen are contacted with the novel bimetallic catalyst at reduction conditions.

As part of the price that has to be paid for a modern industrial society, aqueous solutions of oxysulfur compounds are produced as major products or byproducts of a number of significant industrial activities. By use of the term "oxysulfur compounds," it is intended to cover all common, water-soluble compounds of sulfur and oxygen which are typically formed in industrial waste or process streams, such as sulfuric acid, sulfurous acid and water-soluble salts thereof, thiosulfuric acid and water-soluble salts thereof, and the polythionic acids ($H_2S_nO_6$ wherein $n$ may have any value from 2 to 6 inclusive) and water-soluble salts thereof. These aqueous solutions of oxysulfur compounds are quite prevalent in modern industry primarily because of the widespread utilization of sulfur as a basic chemical reactant or ingredient in many chemical processes and because of the presence of substantial quantities of sulfur in various forms in the fuel used to generate the major portion of energy consumed in a modern industrial economy. The electrical utility industry is, for example, currently faced with a major pollution problem caused by the widespread practice of burning coal and fuel oil containing significant amounts of sulfur in its power stations. During the course of the combustion of the sulfur-containing fuel, the sulfur is converted to oxides of sulfur, primarily sulfur dioxide, with attendant production of a flue or stack gas stream containing substantial amounts of sulfur oxides. Removal of these sulfur oxides from this flue gas, by means of a conventional wet scrubbing procedure with an aqueous absorbent quite commonly results in an aqueous stream containing significant amounts of water-soluble oxysulfur compounds, primarily water-soluble sulfite compounds. Likewise, an aqueous stream containing oxysulfur compounds can be produced by wet scrubbing $SO_2$-containing waste gas streams produced in other industrial activities such as the smelting of sulfur-bearing ores, the refining of sulfur-containing crude oils, the synthesis of sulfuric acid, the sulfonation of hydrocarbons, the production of coke, the production of sulfur in a Claus unit, the production of paper via a wood-pulping process and the like industrial processes.

Aqueous solutions containing water-soluble, inorganic thiosulfate compounds are commonly available as undesired side or drag streams from many economically significant industrial processes in the chemical, petroleum and steel industries. For instance, in the petroleum industry, an aqueous solution containing ammonium thiosulfate is commonly produced as a drag stream from sulfur recovery systems that employ an oxidation technique. These sulfur recovery systems are usually designed to enable the recovery of elemental sulfur from ammonium hydrosulfide solutions which are by-products of such typical refinery processes, as hydrorefining, hydrocracking, catalystic cracking and the like. See for example the sulfur recovery systems disclosed in U.S. Pats. 3,536,619; 3,536,618; 3,531,395; and 3,530,063.

Another common source for thiosulfate-containing aqueous solutions is found in connection with scrubbing processes designed to sweeten natural gas, to purify coal gas, town gas or to clean-up refinery gas streams and the like processes where hydrogen sulfide is scrubbed from a gaseous mixture with an aqueous absorbent to produce a rich absorbent stream which is thereafter regenerated with oxygen. In the Seaboard process, for example, where the absorbent is an aqueous solution of sodium carbonate and the regeneration step essentially involves stripping the absorbed hydrogen sulfide from the rich absorbent solution with large quantities of air. The air used in this regeneration step tends to oxidize some of the absorbed hydrogen sulfide to sodium thiosulfate which causes a build-up of thiosulfate in the absorbent solution. This thiosulfate by-product production problem is commonly handled by periodically or continuously withdrawing a drag stream from the process containing sodium thiosulfate and adding a fresh alkaline reagent. Similar problems of thiosulfate byproduct formation are also found in other $H_2S$-scrubbing processes that employ oxygen to regenerate the rich absorbent regeneration step, the Thylox Process, the Perox Process and the Nickel Process. In all of these wet H₂S-scrubbing processes an inevitable side reaction appears to be one leading to the formation of water-soluble thiosulfate salt by-products, which then accumulate in the scrubbing solution until their presence becomes detrimental. The net amount of the thiosulfate by-product being produced must, therefore, be continuously or periodically purged from the scrubbing system by discarding a drag stream containing a water-soluble thiosulfate compound.

Regardless of the source of the aqueous stream containing oxysulfur compounds, it is clear that there is a substantial need for an effective and simple method for treating these types of solutions in order to remove the oxysulfur compound therefrom and allow either reuse of the resulting treated aqueous solution in the process which produces it or to enable the discharge of the water stream into sewers, rivers or streams without causing any substantial pollution problem. The first alternative is particularly attractive when the sulfoxide-containing solution also contains other valuable reagents such as the Thylox process wherein the drag stream which is withdrawn from the process in order to purge the undesired thiosulfate by-product, also contains sodium carbonate and arsenic trioxide. In addition, the growing sensitivity of the public to the numerous adverse effects of indiscriminate discharge of gaseous and aqueous waste streams containing sulfoxide compounds provides an additional incentive for treating these oxysulfur compound-containing aqueous solution in order to remove the detrimental sulfur-containing compounds therefrom prior to the discharge of the solutions into conventional sewage facilities.

In one specific case of particular interest, hydrorefining or hydrocracking of petroleum distillates containing nitrogenous and sulfurous contaminants, large quantities of ammonia and hydrogen sulfide are present in the effluent stream from the reaction zone, and these contaminants are generally absorbed in an aqueous solution which is injected into the effluent train of cooling means and separating zones associated with the hydrocarbon conversion process. This results in an aqueous waste stream containing ammonium hydrosulfide (NH₄HS) which thereafter can be subjected to a catalytic oxidation step in order to recover sulfur therefrom or to reduce the biological oxygen demand thereof. Despite stringent precautions, a minor amount of thiosulfate salt (i.e. $(NH_4)_2S_2O_3$)

is inevitably formed as a side product in this catalytic oxidation step. The resulting ammonium thiosulfate-containing aqueous solution withdrawn as effluent from this oxidation step cannot ordinarily be reused to recover an additional portion of ammonium hydrosulfide because, if it is injected into the effluent train associated with the hydrorefining or hydrocracking process, the hydrogen sulfide and/or ammonium hydrosulfide present in the effluent from the reaction zone can react with the ammonium thiosulfate to produce free sulfur which can contaminate the hydrocarbon product from this hydrocarbon conversion process leading to severe corrosion problems in downstream equipment. There is thus a substantial need for a method of efficiently and conveniently treating an aqueous solution containing ammonium thiosulfate in order to allow reuse of the aqueous stream within the hydrocarbon conversion process to absorb additional quantities of hydrogen sulfide.

Another specific case of particular interest involves the wet-scrubbing of sulfur dioxide from SO₂-containing gas streams which are produced by the combustion of sulfur-containing fuels, the smelting of sulfur-containing ores and the like industrial activities (as explained hereinbefore) to produce a rich aqueous absorbent stream containing salts of sulfurous acid. A common procedure involves the use of an absorbent which essentially is a solution of a relatively inexpensive alkaline reagent such as the hydroxide and carbonate compounds of ammonia, the alkali metals and the alkaline earth metals. After this solution is used to absorb SO₂ from flue gas, a rich absorbent stream containing the corresponding sulfite compound for example, ammonium sulfite and/or bisulfite and the like compounds is obtained. A novel procedure has recently been proposed for treating this type of sulfite-containing aqueous solution order to minimize the amount of undesired, intractable sulfate compounds formed during the regeneration step. This treatment procedure essentially involves the production of an aqueous stream containing a water-soluble, inorganic thiosulfate compound as an intermediate in the regeneration operation. Both the sulfite-containing aqueous stream withdrawn from the SO₂-scrubber and the thiosulfate-containing stream produced in accordance with this recently developed procedure are aqueous solutions containing oxysulfur compounds which require additional treatment in order to regenerate the scrubbing solution so that it can be recycled to the SO₂-scrubbing step. Thus, in this specific embodiment, there is also a substantial requirement for a treatment procedure which can be effiicently and conveniently operate on these types of oxysulfur compound-containing solutions in order to regenerate the aqueous scrubbing solution.

Not only is there a substantial need for an operative method which could effectively reduce oxysulfur compounds, there is also a requirement that the resulting method be capable of implementation at reasonable cost. Specifically, an overriding consideration in any endeavor of this type is the matter of cost of utilities associated with the contemplated procedure. In the particular case under consideration, a principal criterion for a commercially available solution to this problem of treatment of oxysulfur compounds is the cost of utilities utilized. The prime cost in this area is associated with the temperature that is utilized in the catalytic reactor. In order for a new treatment procedure to achieve widespread acceptance in the water-treating industry it must be capable of operation in an effective fashion at the lowest possible reactor temperature. This directly implies a requirement for a highly active catalyst that maintains relatively high selectivity for sulfide. The problem, therefore, addressed by the present invention is to provide a catalyst meeting this low temperature activity requirement.

We have now found a catalyst which has sharply superior activity at relatively low temperature in a reduction reaction between hydrogen and an aqueous solution of an oxysulfur compound. The basic concept of the present invention developed from our efforts to perfect a class of bimetallic catalyst which have been found to be especially effective at promoting or accelerating the desired reduction reaction. It was first determined that superior catalysts for this reaction are bimetallic catalysts comprising a combination of catalytically effective amounts of cobalt sulfide and molybdenum sulfide with a porous carrier material. Upon further investigation of this class of catalysts in this reduction reaction, we have now discerned that another significant improvement in the performance of this type of catalyst is possible if the catalyst is prepared in a manner designed to insure uniform dispersion of the active ingredients throughout the carrier material. Key features of our method of preparation of this type of catalyst are: (1) sequential impregnation of the active metallic ingredients; (2) sulfiding after each metallic component is combined with the carrier material; (3) careful purging of free sulfide from the vessel containing the monometallic composite after the first metallic component is incorporated in the carrier material and prior to the second impregnation step; (4) presence of both metallic components in the sulfide form; and (5) incorporating the two metallic components in any order (that is, incorporating first cobalt and thereafter molybdenum or the converse procedure).

In summary, we have ascertained that a catalyst comprising catalytically effective amounts of molybdenum sulfide and cobalt sulfide combined with a porous carrier material can be made materially more active for a reduction reaction between an oxysulfur compound and hydrogen to produce sulfide if the catalyst is prepared by a sequential impregnation procedure during which the catalyst is carefully sulfided after each impregnation step and if the first sulfiding step is followed by a purge step designed to remove free sulfide from contact with the partially prepared composite.

It is, accordingly, an object of the present invention to provide an improvement in a method for catalytically reducing an inorganic water-soluble oxysulfur compound with hydrogen to a sulfide compound. Another object is to provide a very active bimetallic catalyst which is capable of accelerating the reaction between an aqueous solution of oxysulfur compounds and hydrogen to selectively produce sulfide. Yet another object is to provide an improved bimetallic catalyst for this oxysulfur compound reduction reaction which enables the selective production of sulfide at relatively mild conditions of temperature and pressure.

In brief summary, a broad embodiment of our invention involves the use in reducing on oxysulfur compound of a unique catalyst comprising a combination of catalytically effective amounts of molybdenum sulfide and of cobalt sulfide with a porous carrier material. This unique catalyst is prepared by a procedure involving a first step wherein the porous carrier material is impregnated with an aqueous solution of a water-soluble, decomposable compound of a first metal selected from the group consisting of molybdenum and cobalt to form a composite containing a metallic component. After the resulting composite is dried, it is sulfided by contacting same with a sulfide-yielding compound at sulfiding conditions. In the next step free sulfide is carefully purged from contact with the resulting sulfided monometallic composite. Thereafter, the resulting composite is treated, in a second impregnation step, with an aqueous solution of a water-soluble decomposable compound of a second metal selected from the group consisting of cobalt and molybdenum to form a bimetallic composite. In this second impregnation step, the second metal is of course the one that was not selected in the first impregnation step so that a bimetallic composite is obtained. Following drying of the resulting bimetallic composite, it is sulfided in the last step by contacting it with sulfide-yielding compounds at sulfiding conditions selected to produce the desired bimetallic catalyst.

In another embodiment, the present invention is a method as outlined above in the first embodiment wherein the porous carrier material utilized is a carbonaceous material and where the sulfide-yielding compound utilized in both of the sulfiding steps is hydrogen sulfide.

Yet another embodiment relates to the catalyst defined above in the first embodiment wherein the catalyst contains on an elemental basis about 0.01 to about 10 wt. percent molybdenum and about 0.1 to about 15 wt. percent cobalt.

In still another embodiment, the present invention is a method for reducing an inorganic, water-soluble oxysulfur compound to a sulfide compound. The method essentially comprises contacting an aqueous solution of an oxysulfur compound and hydrogen with the catalyst described in the first embodiment above at reduction conditions.

Other objects and embodiments of the present invention include specific details about the essential and preferred steps utilized in the preparation of the novel bimetallic catalyst and about oxysulfur compounds, preferred amounts and sources for the hydrogen reducing agent, and preferred reduction conditions and flow schemes for use in the reduction reaction. All of these facets of the present invention are hereinafter disclosed in the following detailed discussion of the essential and preferred features of the present invention.

An essential feature of the present invention involves the use of a specially prepared catalyst comprising a combination of catalytically effective amounts of molybdenum sulfide and of cobalt sulfide with a porous carrier material. Considering first the porous carrier material, it is preferred that the material be a porous, adsorptive high surface area support having a surface area of about 100 to about 1,000 or more m.$^2$/g. The porous carrier material should be relatively refractory to the conditions utilized in the reduction reaction, and it is intended to include within the scope of the present invention, carrier materials which have traditionally been utilized to support transition metals in catalysis such as: (1) activated carbon, coke, or charcoal; (2) silica or silica gel, silicon carbide, clays, and silicates including those synthetically prepared and naturally occurring, which may or may not be acid treated—for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, alumina-boria, silica-zirconia, etc.; (5) crystalline aluminosilicate such as naturally occurring or synthetically prepared mordenite and/or faujasite, either in the hydrogen form or in a form which has been treated with multivalent cations; and (6) combination of one or more elements from these groups.

One preferred class of porous carrier materials for use in the present invention are relatively carbonaceous materials such as activated carbon, the various types of charcoal, coke and refractory inorganic oxides having carbonaceous material deposited thereon. An example of this last type of carrier material is a refractory inorganic oxide which has seen service in a hydrocarbon conversion reaction until it has 5 to 30% or more wt. percent carbon deposited thereon. Within this class of preferred carbonaceous carrier materials, best results are ordinarily obtained when the carrier material is an activated carbon. These activated carbon carrier materials are commercially available under the trade names of Norit, Nuchar, Darco, and the like. Of course, any similar activated carbon material known to those skilled in the art can also be utilized in the present catalyst. Especially preferred activated carbon carrier materials have an apparent bulk density of about 0.1 to about 1 g./cc. and surface area characteristics such that the average pore diameter is about 10 to 1,000 Angstroms, the pore volume is about 0.1 to about 1 cc./g. and the surface area is about 100 to about 1,000 or more m.$^2$/g. In general, excellent results are typically obtained with an activated carbon carrier material (e.g. a Darco activated carbon) with a relatively small particle size (e.g. about 10 to about 30 mesh U.S. standard sieve size) having an apparent bulk density of about 0.43 g./cc. a pore volume of about 0.518 cc./g. and a surface area of about 800 to about 1,100 m.$^2$/g. In addition, the most preferred activated carbon carrier materials for use in the present catalyst are the ones that are classified as having a strong affinity for water; that is, the ones that are lyophilic.

Another preferred class of porous carrier materials are the refractory inorganic oxides, with alumina being most preferred among these. Suitable alumina carrier materials are the transition aluminas known as gamma-, eta-, theta-alumina. A gamma-alumina carrier material ordinarily is the best of these. In general, excellent results are obtained with a gamma-alumina carrier material which is used in the form of relatively small particles (typically about 1/16 inch in diameter) having an apparent bulk density of about 0.5 g./cc., a pore volume of about 0.5 cc./g. and a surface area of about 175 m.$^2$/g.

The starting point for the preparation of the novel catalyst of the present invention is an impregnation step in which a porous carrier material of the type described above is contacted with a solution of a soluble, decomposable compound of a first metal selected from the group consisting of molybdenum and cobalt to form a composite containing a metallic component. It is to be recognized that this first impregnation step can involve either the impregnation of the cobalt component or of the molybdenum component but not both of these components.

In the case where the cobalt component is to be impregnated in this step, the carrier material is contacted with a suitable solution containing a soluble, decomposable cobalt-containing compound. The solvent utilized may be any appropriate solvent in which the cobalt-containing compound is soluble which does not adversely affect the porous carrier material and which does not contaminate the carrier material with undesired ingredients. In most cases we have achieved excellent results by using water as the solvent, although other common polar solvents such as the alcohols and the like are believed to work equally as well. The soluble, decomposable cobalt-containing compound utilized in this impregnation solution is typically a water-soluble salt, such as cobalt acetate, cobalt chloride, cobalt nitrate, cobalt sulfate and the like salts. In the alternative case where the metallic component impregnated in this first step is the molybdenum component, the impregnation solution may contain any suitable soluble, decomposable molybdenum-containing compound such as molybdenum tetrabromide, molybdenum hydroxide, molybdenum oxidibromide, molybdenum tetrachloride, molybdic acid, ammonium molybdate, and the like compounds.

In this first impregnation step, the porous carrier material is contacted with the impregnation solution at impregnation conditions selected to result in the union of the metallic component with the porous carrier material. Generally these impregnation conditions include a temperature of about 0 to 100° C., with the preferred temperature being about 20 to about 60° C., a pressure sufficient to maintain the impregnation solution in the liquid phase, and a contact time sufficient to result in the penetration of the metallic compound into the central region of the porous carrier material, typically achieved in a period of about 0.1 to about 1 or more hours.

Following this first impregnation step, the resulting monometallic composite is dried at a temperature of about 50 to about 150° C. for a period of about 0.5 to about 5 or more hours until the solvent utilized in the impregnation solution is substantially evaporated. The resulting dried composite is then, in the next step, sulfided by contacting with a sulfide-yielding compound at sulfiding conditions. The sulfide-yielding compound utilized in this step may be any inorganic or organic sulfur-containing compound capable of producing a metallic sulfide when contacted with a metal or metal-containing compound at sulfiding conditions. Typically, examples of suitable materials of this type are: hydrogen sulfide, ammonium sulfide and ammonium hydrosulfide, the alkyl and aryl mercaptans, organic and inorganic soluble sulfides and organic thioethers, disulfides, thioaldehydes, thioketones and the like sulfur-containing compounds. Although this sulfiding step may in some cases be performed under liquid phase conditions, the preferred procedure involves contacting a gas stream containing the sulfide-yielding compound with the composite. Accordingly, the sulfide-yielding compounds that are more preferred are volatile at the hereinafter specified sulfiding conditions. In general, we have obtained best results in this sulfiding step when the sulfide-yielding compound is hydrogen sulfide. The sulfiding conditions utilized in this step are selected to produce a reaction between the metallic component of the composite and the sulfur-containing reactant in order to form a metallic sulfide-containing composite. Ordinarily, temperatures ranging from about 10° C. up to 550° C. or more are operative, with the preferred temperatures being about 20 to about 100° C. when $H_2S$ is utilized. Likewise, the pressure utilized can be selected from an extremely broad range as we have found it does not greatly affect the course of the sulfiding reaction. Ordinarily atmospheric or subatmospheric pressures are utilized with good results. With regard to contact time, it is ordinarily preferred to conduct this sulfiding step until the composite no longer reacts with the sulfide-yielding compound; generally, this is accomplished in a period of about 0.5 to about 2 or more hours.

Although any suitable procedure known to those skilled in the art for sulfiding a metal-containing composite can be utilized in the sulfiding step, best results are achieved when this step is performed by using a $H_2S$-containing gas to quench a vacuum maintained about the catalyst. This preferred vacuum techniques involves establishing a vacuum in a closed vessel containing the composite and thereafter injecting the $H_2S$-containing gas into the vessel to raise the pressure in same to a relatively higher level. Ordinarily, the pressure utilized when the vacuum is established is about 0.01 to about 0.5 atmospheres and the relatively higher pressure is about 1 to about 100 or more atmospheres. It is a preferred practice to repeat this quenching technique at least once and preferably two to five times until the composite doesn't absorb any further amounts of $H_2S$.

After this sulfiding step, the next step involves purging free sulfide from contact with the sulfided composite. As will be demonstrated in a subsequent example, we have found this step to be an essential feature of our invention because a markedly inferior catalyst is obtained if it is omitted. This purging step essentially involves contacting the sulfided composite with a relatively inert gas such as nitrogen or the like at conditions selected to remove substantially all free sulfide from contact with the sulfided composite. "Free sulfide" is defined to be any sulfide or equivalent which is not present as metallic sulfide in the composite. Primarily, these conditions include a gas hourly space velocity of about 100 to about 10,000 or more hr.$^{-1}$ and a temperature of about 10 to about 100° C. Thus purge step must be continued until less than 5 p.p.m. of hydrogen sulfide and preferably less than 1 p.p.m. is noted in the effluent stream from the vessel containing the catalyst. It is, of course, understood that the time period determined by this criterion is merely a minimum time and excess purging is by no means detrimental. Typically, excellent results are obtained in this step when it is contacted for a period of about 10 to about 50 or more hours.

After this critical purging step is performed, the next step is a second impregnation step wherein the metal that wasn't added in the first impregnation step is now added. That is, if cobalt was added in the first step, molybdenum is added in this second step and vice versa. The nature of the impregnation solution utilized and the necessary impregnation conditions used for this second impregnation step are identical to those previously given in the discussion of the first impregnation step and will not be repeated here.

After this second impregnation step, the resulting bimetallic composite is dried and sulfided in exactly the same manner as was previously described in conjunction with the first impregnation step to form the instant bimetallic catalyst. The resulting catalyst comprises a combination of catalytically effective amounts of cobalt sulfide and molybdenum sulfide with a porous carrier material. It has been found to possess an extraordinary capability to accelerate a reduction reaction between hydrogen and an oxysulfur compound. This relatively high activity for this reaction is advantageous since it allows the reaction to be conducted at conditions which are relatively low in severity, thereby enabling savings in utilities such as cost of heat generation, cost of compression and the like costs associated with this reduction method. In addition, the instant catalyst possesses a rather unique capability to selectively produce the corresponding sulfide compound as the major product of the reduction reaction. This obviously is of advantage in minimizing the amounts of undesired by-products formed.

Regarding the amounts of the metallic components combined with the porous carrier material, these may, in general, be any amounts which are catalytically effective. In particular for the molybdenum sulfide component, it is preferred that the final catalyst contain about 0.01 to about 10 wt. percent of molybdenum, with a preferred value being about 0.5 to about 5 wt. percent molybdenum. Likewise for the cobalt sulfide component, it is preferred that the final catalyst contain about 0.1 to about 15 wt. percent cobalt, with a preferred value being about 1 to about 10 wt. percent cobalt.

In addition, it is a good practice to control the relative amounts of these metallic components so that the atomic ratio of cobalt to molybdenum contained in the bimetallic catalyst is within the range of about 0.25:1 to about 5:1. In fact, excellent results have been obtained with a catalyst possessing an atomic ratio of cobalt to molybedenum of about 3.5:1.

One embodiment of the present invention involves the use of this specially prepared bimetallic catalyst in a reduction reaction. One reactant for this reduction reaction is a water-soluble oxysulfur compound. As previously explained the use of the term "oxysulfur compound" is intended to cover the common inorganic, water-soluble compound of oxygen and sulfur that are prevalent in modern day industry. It is intended to include within the scope of this term all compounds of oxygen and sulfur that are soluble in water and are capable of being reduced by hydrogen in the presence of a metallic sulfide-containing catalyst. One kind of oxysulfur compound that is included within this definition are the water-soluble inorganic sulfite compounds. These include sulfurous acid, ammonium sulfite and bisulfite, the alkali metal sulfites and bisulfites, the alkaline earth metal sulfites and bisulfites and the like sulfites. Another class of oxysulfur compounds suitable for use herein are the inorganic, water-soluble thiosulfate compounds such as ammonium thiosulfate, the alkali metal thiosulfate, the alkaline earth metal thiosulfate and the like thiosulfates. Typically, excellent results are obtained when the oxysulfur compound is ammonium thiosulfate or sodium thiosulfate. Yet another class of oxysulfur compounds which can be treated by the method of the present invention are the inorganic polythionic compounds such as the polythionic acids (i.e. $H_2S_nO_6$ where $n$ may have a value from 2 to 6 inclusive) the ammonium polythionates, the alkali metal polythionates, the alkaline earth metal polythionates and the like salts of the polythionic acids. Still another large class of compounds of sulfur and oxygen that are included within the scope of the oxysulfur compounds are the water-soluble, inorganic sulfate compounds. These last compounds are, in general, very difficult to treat by the method of the present invention unless the pH of the solution containing them is adjusted to a very low level such that free sulfuric acid would be present in the solution. That is, the only sulfate compound that is readily amenable to treatment by the present invention is sulfuric acid. Ordinarily, best results are obtained when the oxysulfur compound is either a sulfite compound or a thiosulfate compound.

As indicated above, it is an essential feature of the instant method that the oxysulfur compound is charged thereto in an aqueous solution. The amount of oxysulfur compound contained in this solution can range from relatively small amounts up to the solubility limit of the particular oxysulfur compound ni water at the conditions utilized in the present method. Typically, the amount of oxysulfur compound contained in the input aqueous solution will be sufficient to constitute about 0.1 to about 30 wt. percent of the solution. For example, excellent results have been obtained with the present method when an aqueous solution containing about 20 wt. percent of sodium thiosulfate is charged thereto.

The other essential reactant for this reduction reaction is hydrogen. The hydrogen stream for use herein may be obtained from any suitable source or may be prepared in any suitable manner. In addition it may comprise substantially pure hydrogen or a mixture of hydrogen with other relatively inert gases, such as a mixture of hydrogen and nitrogen, a mixture of hydrogen and steam, a mixture of hydrogen with carbon dioxide or carbon monoxide and the like gaseous streams. One acceptable type of hydrogen stream for use herein is obtained by a controlled partial combustion of a hydrocarbon stream, such as a naphtha stream, a natural gas stream, a heavy fuel oil stream and the like hydrocarbon streams, in a noncatalytic reaction with air or pure oxygen at relatively high temperatures of 1,000 to 3,000 or more ° F. and a pressure of about 1 to about 20 atmospheres or more. Another acceptable source for a hydrogen stream is the conversion processes which have a net hydrogen make such as a reforming process, a dehydrogenation process and the like. Yet another common source for an acceptable hydrogen stream is a catalytic steam reforming reaction between a hydrocarbon stream, selected from the light naphthas, natural gas streams, propane streams, LPG streams and the like and steam. This reaction typically involves use of a nickel-containing catalyst at temperatures of 1,000 to 3,000° F. and a pressure of 5 to 50 atmospheres coupled with a suitable CO to $CO_2$ shift reaction step. Of course, a relatively pure hydrogen stream can be easily prepared by an electrolysis procedure if desired. Least preferred of the available commercial sources of hydrogen stream is a stream produced by gasification of a solid carbonaceous material with oxygen or steam; however, such a stream can be utilized if absolutely necessary.

The amount of hydrogen charged to the current method is preferably sufficient to provide at least the stoichiometric amount of hydrogen necessary to reduce all of the sulfur component of the oxysulfur compound to the sulfide state. When the oxysulfur compound is a thiosulfate compound, for example this stoichiometric amount is 4 moles of $H_2$ per mole of thiosulfate. Likewise, when the oxysulfur compound is a sulfite compound the stoichiometric amount necessary to reduce sulfite to sulfide is three moles of hydrogen per mole of sulfite compound. In all cases, it is preferred to operate with an amount of hydrogen which is substantially in excess of this minimum value—especially about 1.5 to about 10 times this minimum value. For example, when the oxysulfur compound is a thiosulfate compound, it is preferred to use about 6 to about 40 moles of hydrogen per mole of thiosulfate. It is, of course, understood that in the preferred case where excess hydrogen is utilized, unreacted hydrogen present in the effluent from the reduction step can be easily separated therefrom in a suitable gas-liquid separating zone and recycled through suitable compressive means to supply at least a portion of the necessary hydrogen for the reduction reaction.

According to the method of the present invention, the aqueous solution containing the oxysulfur compound and the hydrogen stream are contacted with the instant bimetallic catalyst at reduction conditions. This reduction method can be carried out in any suitable manner and in either a batch or continuous type operation. In a batch system, the aqueous solution containing the oxysulfur compound is charged to a reaction zone which is thereafter charged with the desired amount of hydrogen. The catalyst is mixed with the reactants in the reaction zone and agitation and heat is supplied to the zone in order to initiate the desired reaction. In a continuous type system the oxysulfur-containing aqueous stream is passed into the reaction zone in either upward, radial or downward flow with a hydrogen stream being simultaneously charged to the reaction zone in either concurrent or countercurrent flow relative to the aqueous stream. In particular, a preferred embodiment of the instant method involves concurrent flow of the aqueous stream and the hydrogen stream into a reaction zone containing the previously characterized bimetallic catalyst. Although any of the modes of operation known to the art for using a solid catalyst can be utilized in the present invention including a moving bed system or a fluidized bed type system, the preferred procedure involves maintaining the catalyst within the reaction zone as a fixed bed of relatively small particles. Typically, good results are obtained when the particle size is 10 to 30 mesh (U.S. Standard Sieve Series).

In the preferred concurrent flow embodiment, the effluent stream withdrawn from the reaction zone primarily contains the sulfide product of the reduction reaction, a minor amount of unreacted oxysulfur compound, unreacted hydrogen and water. The hydrogen is typically separated from the aqueous effluent stream in a conventional separating zone, and the resulting hydrogen stream recycled through a suitable compressing means to the reaction zone. If desired, the sulfide product may be stripped from the resulting aqueous effluent stream via a suitable stripping step such as by injecting the sulfide containing solution into a stripping column and utilizing steam or any other suitable stripping gas to remove hydrogen sulfide overhead with recovery of substantially sulfide-free aqueous solution from the bottom of the stripping column. The hydrogen sulfide-containing overhead stream may then be processed by conventional techniques to recover sulfur, to produce sulfuric acid or to make any other desired sulfur product. The aqueous solution withdrawn from the bottom of this stripping column then may be discharged or disposed of in any suitable manner without causing any substantial waste disposal problem since it has only a relatively small biological oxygen demand. In some cases the aqueous effluent stream containing the sulfide compound can be directly used in further processing or it can be returned to the process which originally produced the oxysulfur-containing input stream to the present method.

The reduction conditions utilized in the method of the present invention are generally characterized as reduction conditions effective to convert oxysulfur compounds to the corresponding sulfide compound. The reaction temperature is preferably selected from the range of about 50 to about 350° C., with a preferred value being about 75 to about 200° C. The pressure utilized should be sufficient to maintain at least a portion of the input aqueous solution in the liquid phase. In general, a pressure above this minimum pressure is preferred because it has been noted that the extent of conversion increases with increasing pressure. However, the use of an extremely high pressure is relatively costly; accordingly, pressure of about 100 to about 3,000 p.s.i.g. is preferred. In a batch embodiment of the present method, the contact time utilized is preferably about ½ to about 5 or more hours, with best results obtained at 0.75 to about 2.5 hours. In a continuous process, it is preferred to use a LHSV (defined on the basis of the charge rate of the input solution divided by the volume of the catalyst bed) in the range of about 0.25 to about 10 hrs.$^{-1}$, with best results obtained at about 0.5 to about 3 hrs.$^{-1}$.

The following examples are given to illustrate further the preferred mode of operation and utility of the present invention. These examples are intended to be illustrative rather than restrictive.

EXAMPLE I

In order to demonstrate that the order of the impregnation of the metallic components does not affect the unique performance characteristics of the catalyst of the present invention, two catalysts were prepared. Catalyst "A" was a combination of a molybdenum sulfide and cobalt sulfide with a Darco carbon carrier material in an amount such that the final catalyst contained, on an elemental basis 4.6 wt. percent cobalt and 2.3 wt. percent molybdenum. Catalyst "A" was prepared by impregnating 10 to 30 mesh particles of Darco activated carbon (having an ABD of 0.43 cc./g., a pore volume of about 0.518 cc./g. and a surface area of about 800 to about 1,100 m.$^2$/g.) with an aqueous solution of cobalt acetate in an amount selected to result in a final catalyst containing 4.6 wt. percent cobalt. The impregnation step was conducted at room temperature and atmospheric pressure for about 0.5 hours. Thereafter, the excess solution was evaporated in a rotary evaporator at a temperature of about 105° C. for about one hour. The resulting dried monometallic composite was then placed in a closed vessel and the vessel evacuated to a pressure of about 20 mm. A stream of pure hydrogen sulfide was then used to quench this vacuum in this closed vessel and return same to atmospheric pressure. This vacuum quenching technique was repeated three times until the composite did not adsorb any further amounts of sulfide. The resulting sulfided composite was then subjected to a purging step with a substantially pure nitrogen stream at room temperature, atmospheric pressure and a gas hourly space velocity of about 500 hrs.$^{-1}$. This purge step continued until less than 1 p.p.m. of $H_2S$ was present in the effluent gas stream from the vessel containing the catalyst. The resulting purged composite was then contacted, in a second impregnation step, with an aqueous solution containing ammonium hydroxide and molybdic acid in an amount sufficient to result in a final catalyst containing 2.3 wt. percent molybdenum. The second impregnation step was conducted under conditions identical to the first impregnation step. The resulting bimetallic composite was then dried and sulfided in a manner identical to that used after the first impregnation step to yield Catalyst "A."

Catalyst "B" was prepared in a manner analogous to that utilized for the preparation of Catalyst "A" except that the molybdenum sulfide component was incorporated in the first impregnation step and the cobalt sulfide component was incorporated in the second impregnation step. The amounts of these components utilized were identical to that utilized in the preparation of Catalyst "A." Accordingly, Catalyst "B" is an example of a catalyst prepared by the method of the present invention where molybdenum is first put on the catalyst and cobalt is subsequently put on the catalyst. On the other hand, Catalyst "A" is an example of the converse procedure.

The resulting catalysts were utilized in a test to determine their relative activity for the reduction of an aqueous solution of an oxysulfur compound with hydrogen. In this test, the input aqueous solution was an aqueous solution of sodium thiosulfate containing 9.08 wt. percent sulfur in the form of thiosulfate. The comparison tests were all made in a pilot plant wherein each catalyst was loaded into a conventional reaction zone and the mixture of aqueous solution and hydrogen stream was passed downflow into the reaction zone. The conditions utilized in this test were a pressure of 500 p.s.i.g., a LHSV of 1 hrs.$^{-1}$ and a mole ratio of hydrogen to sodium thiosulfate of 4:1. The reaction temperatures utilized in each run are given in the following Table I. Each test run consisted of an 8 hour line-out period and an eight hour test period. The results of these comparison runs are presented in Table I in terms of reaction temperature utilized and percent of sodium thiosulfate charged to the reactor that was converted therein to sulfide—typically sodium sulfide or sodium hydrosulfide.

TABLE I

| Run No. | Catalyst | Inlet reactor temp., °C. | Conversion to S⁻, percent |
|---|---|---|---|
| 1 | A | 175 | 94 |
| 2 | A | 150 | 97 |
| 3 | A | 125 | 65 |
| 4 | B | 175 | 98 |
| 5 | B | 150 | 95 |
| 6 | B | 125 | 67 |

With reference now to Table I, it can be seen that the performance of Catalyst "A" and Catalyst "B" at the three temperature conditions studied were essentially equivalent. These results then establish that the beneficial effect of the catalyst of the present invention can be obtained regardless of the order of the impregnation of the metallic components.

EXAMPLE II

Another series of experiments were conducted in order to determine if simultaneous impregnation of the metallic component would yield acceptable results. In order to perform this study, Catalyst "C" was prepared by contacting 10 to 30 mesh particles of Darco activated carbon with an impregnation solution containing ammonium hydroxide, molybdic acid and cobalt acetate in amounts sufficient to result in a catalyst containing 2.3 wt. percent molybdenum and 4.6 wt. percent cobalt. The impregnation step and the subsequent drying and sulfiding step were all performed according to the procedure outlined above in Example I for Catalyst "A." The resulting catalyst was then used in a series of experiments which were identical to the experiments described in Example I. The results of these experiments are presented in Table II for Catalyst "C" and Catalyst "A" in the same terms that were utilized in Table I.

TABLE II

| Run No. | Catalyst | Inlet reactor temp., °C. | Conversion to S⁻, percent |
|---|---|---|---|
| 1 | A | 175 | 94 |
| 2 | A | 150 | 97 |
| 3 | A | 125 | 65 |
| 7 | C | 175 | 97 |
| 8 | C | 150 | 89 |
| 9 | C | 125 | 35 |

With reference now to Table II, it can be seen that the performance of Catalyst "C" was sharply inferior to the performance of Catalyst "A" at the lower temperatures. Specifically, at 125° C. Catalyst "C" only converted 35% of the thiosulfate to sulfide. This stands in sharp contrast to the 65% conversion achieved by Catalyst "A." The detrimental effect of simultaneous impregnation on the lower temperature activity of the catalyst is thus evident.

EXAMPLE III

In order to demonstrate that the purge step after the first impregnation step is essential, a catalyst was prepared in exactly the same manner as outlined for Catalyst "B" of Example I except that the purge step after the first sulfiding step was omitted. This last catalyst is designated Catalyst "D". It was then utilized in a series of experiments which were identical to the ones described in Example I for Catalyst "B". The results of these tests for Catalyst "B" and Catalyst "D" are present in Table III in exactly the same terms that were utilized in Table I.

TABLE III

| Run No. | Catalyst | Inlet reactor temp., °C. | Conversion to S⁻, percent |
|---|---|---|---|
| 4 | B | 175 | 98 |
| 5 | B | 150 | 95 |
| 6 | B | 125 | 67 |
| 10 | D | 175 | 99 |
| 11 | D | 150 | 74 |
| 12 | D | 125 | 41 |

Referring now to Table III, it can be easily ascertained that the low temperature performance of Catalyst "D" was sharply inferior to that of Catalyst "B". Specifically, the conversion to sulfide declined from 67% to 41% when the purge step was omitted. The critical significance of the purge step for catalyst activity is evident.

EXAMPLE IV

In order to determine if impregnating with a soluble molybdenum compound followed by sulfiding is essential, a catalyst was prepared by impregnating a Darco activated carbon carrier material with a colloidal suspension of molybdenum sulfide in methanol in an amount sufficient to result in a final catalyst containing 2.3 wt. percent molybdenum. The resulting molybdenum-containing composite was then dried and impregnated with an aqueous solution containing cobalt acetate in the manner described for Catalyst "B" in Example I. The resulting cobalt and molybdenum-containing composite was then dried and sulfided according to the procedure described in Example I. The resulting catalyst contained 4.3 wt. percent cobalt and 2.3 wt. percent molybdenum. This catalyst designated Catalyst "E" was then utilized in a series of experiments which were identical to those described in Example I. The results with Catalyst "E" are presented in Table IV along with the results for Catalyst "B" where a soluble molybdenum compound was first impregnated and the resulting composite thereafter sulfided.

TABLE IV

| Run No. | Catalyst | Inlet reactor temp., °C. | Conversion to S⁻, percent |
|---|---|---|---|
| 4 | B | 175 | 98 |
| 5 | B | 150 | 95 |
| 6 | B | 125 | 67 |
| 13 | E | 175 | 89 |
| 14 | E | 150 | 43 |
| 15 | E | 125 | 19 |

By comparing the results for Catalysts "B" and "E" it can be discerned that the effect of starting directly with molybdenum sulfide is detrimental to the low temperature performance of the bimetallic catalyst. From the results of these experiments, it can be concluded that it is essential that the molybdenum sulfide is formed in situ after a soluble species of molybdenum is used to impregnate the carrier material.

It is intended to cover by the following claims all changes and modifications of the above disclosure of the present invention that would be self-evident to a man of ordinary skill in the catalyst formulation art and in the catalytic water-treating art.

We claim as our invention:

1. A method for reducing an inorganic, water-soluble oxysulfur compound to a sulfide compound, which method comprises contacting an aqueous solution of the oxysulfur compound and hydrogen, at reduction conditions including a temperature of about 50 to 350° C. and a pressure at least sufficient to maintain a portion of said aqueous solution in the liquid phase, with a catalyst comprising a combination of catalytically effective amounts of molybdenum sulfide and of cobalt sulfide with a porous carrier material, said catalyst being prepared by the steps of:

(a) impregnating a porous carrier material with a solution of a soluble, decomposable compound of a first metal selected from the group consisting of molybdenum and cobalt to form a composite containing a metallic component;

(b) drying the resulting composite;

(c) sulfiding the resulting dried composite by contacting same with a sulfide-yielding compound at sulfiding conditions;

(d) purging free sulfide from contact with the resulting sulfided monometallic composite;

(e) impregnating the resulting composite with a solution of a soluble, decomposable compound of a second metal selected from the group consisting of cobalt and molybdenum, said second metal not being the same as said first metal, to form a bimetallic composite;

(f) drying the resulting bimetallic composite; and thereafter, (g) sulfiding the resulting dried bimetallic composite by contacting same with a sulfide-yielding compound at sulfiding conditions selected to produce the catalyst.

2. A method as defined in claim 1 wherein the porous carrier material is a carbonaceous material.

3. A method as defined in claim 2 wherein the carbonaceous material is activated carbon.

4. A method as defined in claim 2 wherein the carbonaceous material is high surface area coke.

5. A method as defined in claim 2 wherein said carbonaceous carrier material is charcoal.

6. A method as defined in claim 1 wherein the porous carrier material is a refractory inorganic oxide.

7. A method as defined in claim 6 wherein the refractory inorganic oxide is alumina.

8. A method as defined in claim 1 wherein said sulfide-yielding compound utilized in steps (c) and (g) is hydrogen sulfide.

9. A method as defined in claim 1 wherein steps (c) and (g) are both performed by lowering the pressure in a vessel containing the composite to a pressure substantially below atmospheric pressure and thereafter using a hydrogen sulfide-containing gas to raise the pressure of said vessel to at least atmospheric pressure.

10. A method as defined in claim 1 wherein the molybdenum sulfide component of the catalyst comprises about 0.1 to about 10 wt. percent of the catalyst, calculated on an elemental molybdenum basis.

11. A method as defined in claim 1 wherein the cobalt sulfide component of the catalyst comprises about 0.1 to about 15 wt. percent thereof, calculated on an elemental cobalt basis.

12. A method as defined in claim 1 wherein the amounts of the cobalt sulfide component and the molybdenum sulfide component are selected to result in a catalyst possessing an atomic ratio of cobalt to molybdenum of about 0.25:1 to about 5:1.

13. A method as defined in claim 1 wherein the oxysulfur compound is a water-soluble, inorganic sulfite compound.

14. A method as defined in claim 13 wherein the sulfite compound is selected from the group consisting of the sulfites and bisulfites of ammonia, the alkali metals and the alkaline earth metals.

15. A method as defined in claim 1 wherein the oxysulfur compound is a water-soluble, inorganic thiosulfate compound.

16. A method as defined in claim 15 wherein the thiosulfate compound is selected from the group consisting of ammonium thiosulfate, the alkali metal thiosulfates and the alkaline earth metal thiosulfates.

17. A method as defined in claim 15 wherein the thiosulfate compound is sodium thiosulfate.

18. A method as defined in claim 15 wherein the thiosulfate compound is ammonium thiosulfate.

19. A method as defined in claim 1 wherein the oxysulfur compound is a water-soluble, inorganic polythionic compound.

20. A method as defined in claim 15 wherein hydrogen is present in an amount corresponding to a mole ratio of hydrogen to said thiosulfate compound of about 6:1 to about 40:1.

References Cited

UNITED STATES PATENTS

| | | | |
|---|---|---|---|
| 2,687,381 | 8/1954 | Hendricks | 252—465 |
| 3,058,896 | 10/1962 | Nahin | 252—439 |
| 3,558,272 | 1/1971 | Urban | 423—562 |
| 3,635,820 | 1/1972 | Urban | 423—564 |
| 3,709,660 | 1/1973 | Urban | 423—561 |
| 3,737,517 | 6/1973 | Urban | 423—560 |

EDWARD MEROS, Primary Examiner

B. E. HEARN, Assistant Examiner

U.S. Cl. X.R.

423—561, 566